Feb. 6, 1951  F. A. KING  2,540,338
FISHING REEL
Original Filed Oct. 31, 1944   2 Sheets-Sheet 1
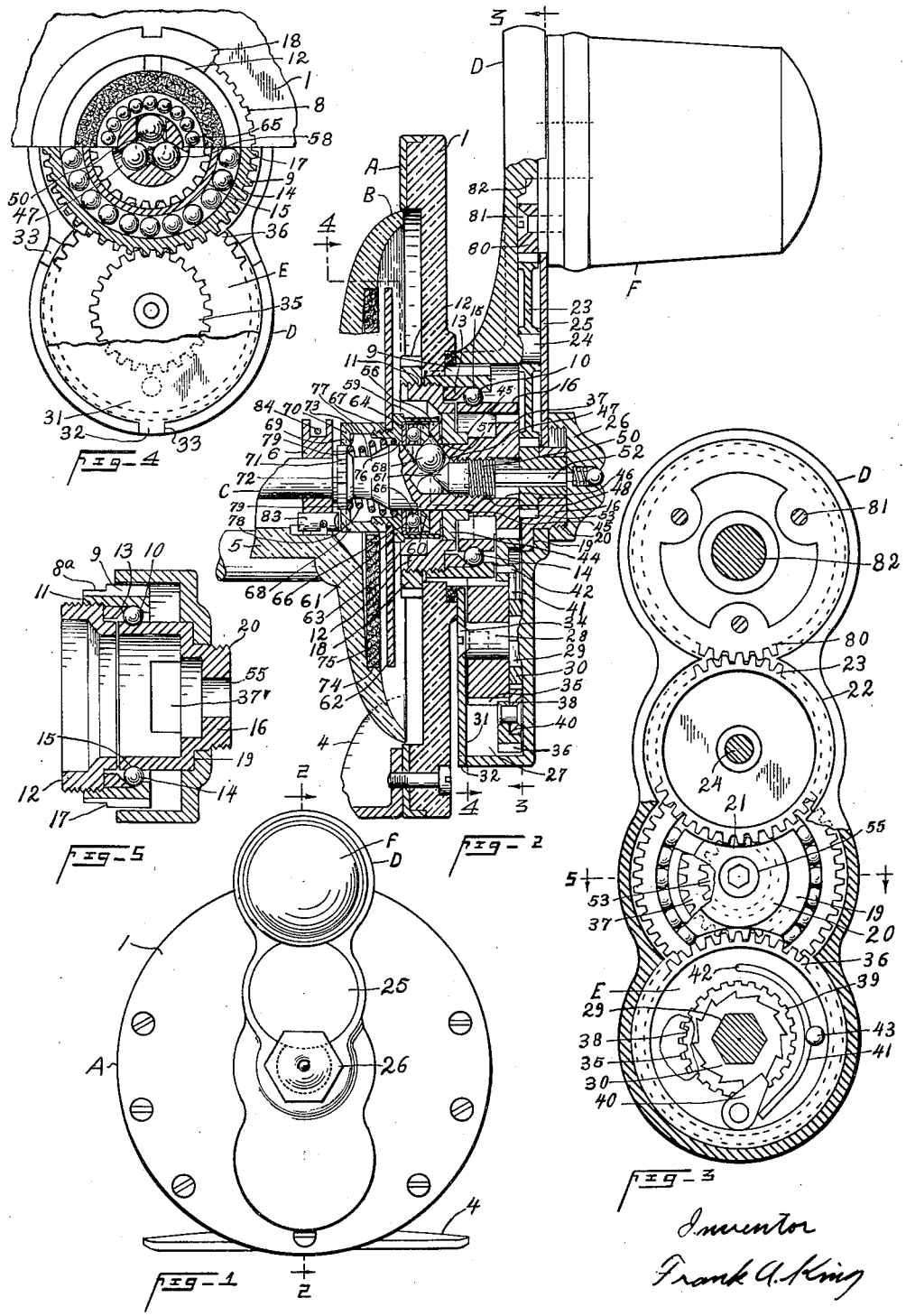
Inventor
Frank A. King

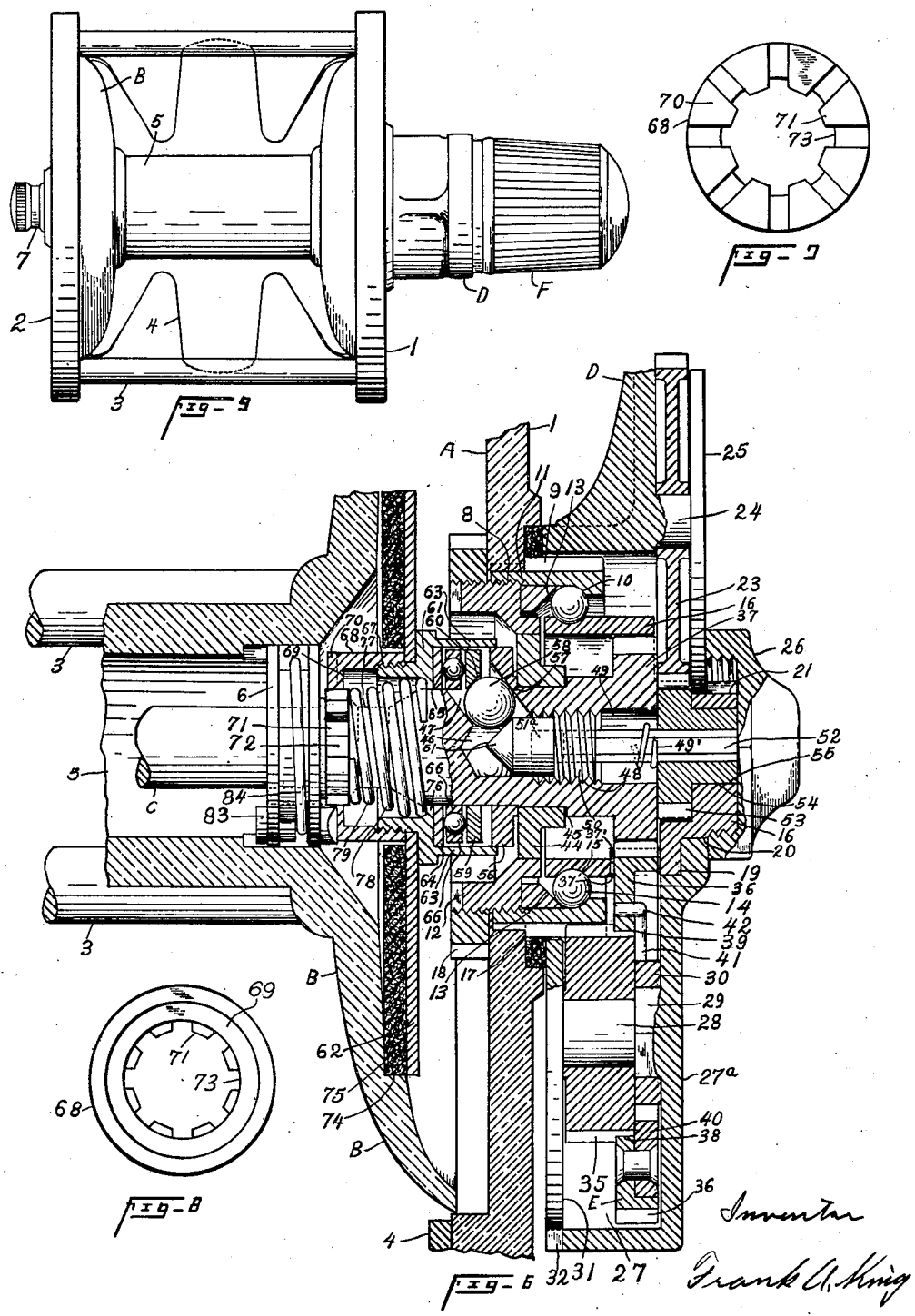

Patented Feb. 6, 1951

2,540,338

UNITED STATES PATENT OFFICE 2,540,338

FISHING REEL

Frank A. King, deceased, late of Los Angeles, Calif., by William Scott King, Tujunga, and Ernest Lynn King, Los Angeles, Calif., and A W. Tedstrom, Parsons, Kans., administrators, assignors to Mary L. King, Tujunga, Calif.

Substituted for abandoned application Serial No. 561,229, October 31, 1944. This application July 25, 1947, Serial No. 763,652

4 Claims. (Cl. 242—84.7)

This application is filed as a substitute for application Serial No. 561,229, filed October 31, 1944.

The invention relates to crank-operated fishing reels and is primarily concerned with the general improvement and strengthening of the parts, to give the crank and its clutch-adjusting mechanism a more accurate and sturdy rotatable support.

An important object of the invention resides in the provision of means including an adjustable radial bearing of relatively-large diameter which is capable of providing axial support and preventing lateral sway of the crank, thus eliminating the employment of closely-associated dual antifriction bearings as disclosed in the United States Letters Patent for Fishing Reel, No. 2,219,322, issued October 29, 1940.

It is an object of this invention to provide a crank having a gear chamber in the counterbalance end of the crank enclosing the spool driving-gears, thus eliminating the employment of a counterbalance as shown in the United States Letters Patent for Fishing Reel, No. 2,054,823, issued Sept. 22, 1936.

It is an important object of the invention to provide a new means for securing a stationary ring gear to the reel frame, which arrangements afford the advantage of an internal ball race therein, thus eliminating the externally threaded boss as shown in the latter-mentioned patent, which elimination provides ample space for the ball action clutch-adjusting mechanism in lieu thereof.

Heretofore, trouble has been experienced with flat spots wearing on the adjusting ball of such mechanism, due to their inability to rotate while shifting under pressure of the adjusting screw cone, therefore it is an object of the invention to provide a frictionless thrust bearing which permits the adjusting balls to roll on the cone of the adjusting screw.

Still another object of the invention is to provide a crank mounting wherein the gearing, together with the ball-clutch-adjusting mechanism, is protected by a clutch disk carrier having a telescopic cover sleeve which rotates as a unit with the spool shaft, and which carrier is substantially arranged with a threaded click member so as to rigidly secure the disk against displacement.

With the foregoing objects in view, together with such other objects and advantages as may subsequently appear, the invention is carried into effect as illustrated by way of example in the accompanying drawings, in which:

Fig. 1 is an end view of a fishing reel exteriorly of the crank and embodying my improvements;

Fig. 2 is a cross section of the same embodiment taken on an enlarged scale on line 2—2 of Fig. 1;

Figs. 3 and 4 are detail sections through the crank taken on lines 3—3 and 4—4 of Fig. 1 showing the gears in side elevation;

Fig. 5 is a transverse sectional view of the radial bearing assembly as it would appear partly disassembled;

Fig. 6 is an enlarged sectional view, similar to Fig. 2, showing certain of the parts in elevation;

Figs. 7 and 8 are opposite end views of a disassembled click nut;

Fig. 9 is a top view of Fig. 1.

Referring to Figs. 1 to 9 inclusive of the drawings more specifically, wherein the invention is embodied in a fishing reel, it is seen that such a reel includes a frame A made up of recessed end plates 1 and 2 held in opposite-spaced relation by the usual bars 3 and the reel seat 4, the latter affording attachment of the reel to the rod. Supported on the frame A is a spool B having a tubular hub 5, supported for free spool action on the spool shaft C, by means of bearing 6. The shaft C extends through the hub 5, the tail end of which is rotatably supported in the plate 2 by means of the usual tail socket assembly 7 and a bearing, similar to bearing 6, is not shown as it forms no part of this invention.

The head plate 1 is formed with a concentric opening, wherein is moulded a circle of internal splines 8 which non-rotationally support a stationary ring-shaped sun gear 9, as more clearly shown in Figs. 4, 5 and 6. Gear 9 is provided with an internal cone-like ball race 10 for balls 14 and said race is internally threaded as at 11 for the reception of a bearing supporting and adjusting ring 12 which abuts a beveled-faced ball race 13 within ring gear 9, thus providing adjustment for ring 12 and for pre-loading of balls 14. The latter, by means of raceway 15, support a hollow rotatable crank trunnion 16 for the crank D of the spool. By means of the threaded engagement 11, the ring 12 serves to adjust the race 13 against the balls 14 so that they snugly roll in the raceway 15 to support the trunnion 16 and the crank D against lateral sway or wobble.

Sun gear 9 has a section of its teeth cut away, down to the pitch circle to form splines 8a corresponding to and interfitting the splines 8. This provides annular shoulders 17 which abut the outer face of plate 1 whereby the sun gear 9 is securely non-rotationally attached to the head plate 1. The same is held in place by means of an internally-threaded lock nut 18 which is threaded over the extending end portion of the adjusting ring 12 and engaged against the opposite face of plate 1 to ring 12 in place.

A threaded reduced end on the trunnion 16 provides a stop shoulder 19 and a boss 20 for support of the fulcrum or midway portion of the crank D which is recessed and apertured for this purpose.

It will be seen in Fig. 3 that the boss 20 is formed with an arcuate recess 21, and the crank D is provided with a recess 22 which forms a continuation of recess 21, thus providing an annular housing for an idle spur gear 23 rotatably mounted on a stud 24. A cover plate 25 is press fitted in this recess 22 and the arcuate recess 21, the portion in the latter serving as a key to lock the crank and the trunnion 16 against relative rotational movement. These parts are securely united by a nut 26 which is threadedly engaged with the remaining threaded periphery of the boss 20.

In this instance, the end of crank D, on the side of the boss 20 opposite to gear 23, and the inner side thereof, is formed with a suitable gear case 27. The counterbalance portion 27a of the gear case affords an integral supporting stud 28 having a hexagon boss 29, over which is press fitted a fixed ratchet member 30.

A cover plate 31 for the gear case is held in place by means of radial teeth 32 which are seated in suitable slots 33, formed in the crank. A screw 34, threaded in the inner end of stud 28, is, thereby, adapted to enclose within said recess 27 means such as a train of gears for back gearing the shaft C to the crank D as shown in Figs. 3, 4 and 6.

In mesh with said sun gear 9 is a pinion gear 35 rotatably mounted on the stud 28, which pinion gear carries a drive gear 36 of larger diameter. The latter intersects the wall of trunnion 16 by way of an opening 37' and engages a spool shaft pinion 37. Gear 35 also has an annular section of its teeth cut away, down to the pitch diameter circle, thus forming a splined portion 38 which, in this instance, is press fitted into suitable corresponding splines 39, interiorly of the gear 36. This provides a unitary or compound gear E.

Gear 36 carries a pivoted pawl 40 adapted to coact with the ratchet 30 under the urge of an arcuate spring 41. To this end, the end 42, diametrically opposite the pawl is fixed to the compound gear E and a rivet 43 on the latter serves to urge spring 41 to press on pawl 40. It will be observed that counterclockwise rotation of the crank will be prevented by the pawl 40 through the medium of the compound gear E and the stationary gear 9. On the contrary, clockwise rotation of the crank D will rotate the gear E about the outer end of gear 9, and its larger diameter 36 will back-gear drive the spool-shaft pinion gear 337 and its shaft C in reverse direction to that of the crank D.

Ring 12 affords a section of offset reduced inner diametrical surface, wherein is snugly fitted a bearing 44 which abuts a shoulder 45 on the shaft C.

Shaft C is provided with a deep central bore 46 which intersects angularly radial multiple ball channels 47, and the outer end of this bore is slightly enlarged, adjacent to which is provided screw threads 48, thus providing a screw chamber 49 for the accommodation of an adjusting screw 50 and a coil spring 49' which is adapted to urge the screw 50 into the threads 48 for axial movement in and out of said threads 48. Screw 50 is formed with an inner cone point 51 and the outer end is provided with a deep hexagon socket 51a which slides over a suitable hexagon shank 52, the latter carrying the spring 49'. The shank is press fitted into an adjusting gear 53 having a hub 54 journaled in a suitable bearing 55, interiorly of the hollow trunnion 16. Thus this gear 53 is adapted to rotate with the gear 37 as a unit or independent thereof.

In accordance with the invention and as best shown in Figs. 2 and 6, a new type of frictionless ball action clutch-adjusting mechanism is carried interiorly of the shaft C. A retainer ring 56 is press fitted against a shallow stop shoulder 57 of said shaft to prevent axial displacement of the bearing 44 and permit free rotation of the shaft between the shoulder with respect to ring 56.

Ball channels 47 are disposed at an approximate angle 45° to the bore 46, which angle intersects the inner side wall of ring 56 to retain the balls 58 therein. Complementary to this ring 56 is a flat-faced thrust collar or ring 59, including a raceway 60 of an angle approximately 90° to the channels 47 and substantially parallel to the cone face 51 of screw 50, whereby the balls 58 are adapted for shiftable radial and rotational movement simultaneously therebetween, in their respective channels 47.

Numeral 61 indicates a transverse wall of a tubular sleeve-like member, comprising a clutch disk carrier for the disk 62 which is press fitted thereagainst, and this carrier 61 includes an enlarged tubular end 63 which is adapted to telescope over the retainer ring 56, thus providing enclosed protection for the balls 58 and their frictionless clutch collar assembly which is seated against the interior wall of the carrier 61. This assembly includes a flat raceway 64, and the flat face of collar 59 serves as the opposite raceway for the balls 65 therebetween, the same being spaced apart by the ball retainer 66. External screw threads 67 are provided on the small end of carrier 61, over which is screw-threadedly engaged a cup-shaped click nut 68 which clamps the disk 62 to its carrier 61.

As seen in Figs. 7 and 8, the click nut 68 is formed with an inwardly projecting flange 69, on the end face of which is machined a circle of quadrantal-shaped teeth 70 (as indicated by dotted lines in Figs. 2 and 6) the apices of which teeth extend radially inward to the root diameter circle 71 of corresponding shaped teeth 72 milled in a short cylindrical rim portion of shaft C, best shown in Fig. 6.

Opposite the teeth 70, the flange 69 is counterbored, thus providing an internal annular bearing surface 73 which slides axially over the periphery of teeth 72 whereby to provide keyed axial movement of the nut 70, and its united parts, including carrier 61 and the disk 62.

As seen more clearly in Figs. 2 and 6, spool B is formed with a concentric recess 74, wherein is press fitted a fiber frictional disk 75 whereby the torsional stresses generated thereby, when the clutch disk 62 is frictionally engaged with disk 75 as shown in Fig. 6, tend only to tighten the click nut 68 on the threads 67. It will now be seen that disk 62 is rigidly secured to its carrier 61 and, in turn, the carrier affords the bearing points 72 and 56 which are sufficiently spaced apart to provide accurate radial support for the disk 62.

Abutting the back side of race 64, the carrier 61 is formed with an inwardly-projecting annular flange 76. Intermediate the latter and the teeth 72, the shaft C is swaged as at 77 to provide clearance for a helically-tapered coil compression spring 78, the smaller end 79 of which is threadedly sprung over the teeth 72, thus providing a seat therefor.

Obviously, the force of spring 78 functions through the medium of its seat abutting the teeth 72 and thereby coacts with the flange 76 to disengage the clutch disks 62 and 75, when the screw 50 is backed off by rotation of the hexagon shank 52 and its connected gear 53 which, as seen in Fig. 3, engages the idle gear 23. The latter gear is in mesh with gear 80 which is fixed to the handle F on the crank D by means of screw 81.

As the crank is turned, the gear train 9, 35, 36 and 37 drives the shaft C and, with the clutch engaged, the spool B. During this cranking movement, the handle F rotates on integral pin 82 of the crank in accordance with the gear train 53, 23 and 80 that adjusts the clutch. By designing the two gear trains to have like ratios, the handle F completes one revolution on said pin for each rotation of the crank without affecting the adjustment of the clutch. However, at any time during the cranking operation, by a simple twist of the hand or the fingers grasping the handle, the clutch adjusting gear train can be actuated to vary the frictional resistance of the clutch and/or disengage the same.

Assuming now that the clutch is disengaged, as shown in Fig. 2, and the screw 50 is given a right turn by the operator through the medium of the adjusting gear train aforedescribed, it will be seen that the clutch collar 59 of the frictionless bearing assembly will counter-rotate with respect to the screw 50, so as to permit the balls 58 to rotate on their own axis as they are driven by the contact of cone 51 which rotates therebetween, as it is screwed axially inward. Obviously, such movement of screw 50 will effect axial movement of the clutch disk 62 and its connected click teeth 70, to alternately engage and disengage with a click pin 83 which is eccentrically carried by the bearing 6, there being a circular spring 84 carried by the latter which spring urges the pin 83.

The improved fishing reel may be made in various sizes for use in practically all kinds of fishing, and the parts are closely associated due to their general concentric form, and are therefore economical to manufacture and easy to enclose so that extraneous matter will not be permitted to interfere with proper operation.

It is evident that various changes may be resorted to in the construction, form and arrangement of the several parts without departing from the spirit and scope of the invention, hence it is not intended to be limited to the particular embodiment herein shown and described; but what is claimed is:

1. In a reel having a central shaft, a spool and clutch means interconnecting the shaft and spool, screw means axially adjustable on the shaft for operating the clutch means, a crank mounted to rotate on the axis of the shaft, a handle rotatably mounted on one end of said crank, a gear train extending through said crank and operatively connecting the handle and the screw means, and a second gear train embodied in the crank on the opposite side of the axis of the shaft to the first-mentioned gear train and responding to rotation of the crank for rotating the shaft.

2. In a reel having a central shaft, a spool and clutch means interconnecting the shaft and spool, screw means axially adjustable on the shaft for operating the clutch means, a crank mounted to rotate on the axis of the shaft, a handle rotatably mounted on one end of said crank, a gear train extending through said crank and operatively connecting the handle and the screw means, and a second gear train embodied in the crank on the opposite side of the axis of the shaft to the first-mentioned gear train and responding to rotation of the crank for rotating the shaft, said gear trains having like ratios, whereby upon one rotation of the crank on its center, the handle will turn one revolution on its center.

3. In a fishing reel, a plate having an opening therein, a ring-shaped sun gear fixed in said opening, a fixed ball race within said sun gear, an axially adjustable ball race within said sun gear, an adjustable ring for adjusting said adjustable race and mounted in said sun gear, a rotary hollow trunnion mounted in said run gear, ball bearings interposed between said races and said trunnion, a crank fixed to said trunnion, a shaft carried by said plate, and gearing associated with the sun gear, shaft and crank and arranged to rotate the shaft responsive to turning of the crank.

4. In a fishing reel, a plate having an opening therein, a ring-shaped sun gear fixed in said opening, a hollow trunnion mounted for rotation within said sun gear, bearing means interposed between said trunnion and said sun gear, a spool shaft supported by said plate and extending into said trunnion, a drive gear fixed on said shaft and disposed within said trunnion, a crank fixed to said trunnion, and gear means associated with said sun gear, drive gear and crank for rotating said spool shaft and including a gear carried on the crank and meshing with said drive gear, said trunnion having an opening therein through which the last-named gear meshes with said drive gear.

WILLIAM SCOTT KING.
ERNEST LYNN KING.
A W. TEDSTROM.

*Administrators of the Estate of Frank A. King, Deceased.*

REFERENCES CITED

The following references are of record in the file of this patent:

UNITED STATES PATENTS

| Number | Name | Date |
| --- | --- | --- |
| 37,110 | Rochow | Dec. 9, 1862 |
| 478,752 | Jaquish | July 10, 1892 |
| 2,054,823 | King | Sept. 22, 1936 |
| 2,162,726 | King | June 20, 1939 |
| 2,219,322 | King | Oct. 29, 1940 |